United States Patent
Appleby et al.

(10) Patent No.: US 7,797,945 B2
(45) Date of Patent: *Sep. 21, 2010

(54) BLEED VALVE OUTLET FLOW DEFLECTOR

(75) Inventors: Andrew Appleby, Phoenix, AZ (US);
Charles E. Kesner, Mesa, AZ (US);
Todd C. Garrod, Gilbert, AZ (US); Joel E. LaBenz, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/517,139

(22) Filed: Sep. 6, 2006

(65) Prior Publication Data

US 2008/0053105 A1 Mar. 6, 2008

(51) Int. Cl.
*F01D 25/00* (2006.01)

(52) U.S. Cl. .......................... 60/795; 415/144

(58) Field of Classification Search ............... 60/782, 60/785, 795, 726; 415/208.1, 28, 914, 145, 415/144; 137/219; 251/266, 267
See application file for complete search history.

(56) References Cited

U.S. PATENT DOCUMENTS

| | | | |
|---|---|---|---|
| 2,861,419 A | 11/1958 | Hausmann | |
| 3,134,229 A | 5/1964 | Johnson | |
| 4,275,857 A | 6/1981 | Bergsten | |
| 4,537,277 A * | 8/1985 | Bryce | 181/214 |
| 4,546,605 A | 10/1985 | Mortimer et al. | |
| 4,916,906 A * | 4/1990 | Vogt | 60/757 |
| 5,127,221 A | 7/1992 | Beebe | |
| 5,203,163 A | 4/1993 | Parsons | |
| 5,351,473 A * | 10/1994 | Shuba | 60/782 |
| 5,704,207 A | 1/1998 | Jensen et al. | |

(Continued)

FOREIGN PATENT DOCUMENTS

EP   1300567 A2   9/2003

(Continued)

OTHER PUBLICATIONS

U.S. Appl. No. 11/253,026, filed Oct. 17, 2005, Appleby et al.

(Continued)

*Primary Examiner*—Michael Cuff
*Assistant Examiner*—Vikansha S Dwivedi
(74) *Attorney, Agent, or Firm*—Ingrassia Fisher & Lorenz, P.C.

(57) ABSTRACT

A bleed valve assembly for discharging bleed air into a gas turbine engine bypass plenum includes a bleed flow duct, a bleed valve, and a flow deflector. The bleed flow duct is contoured such that it delivers uniformly flowing bleed air to the flow deflector when the bleed valve is in the open position. The flow deflector has a plurality of openings formed therein. Each opening fluidly communicates the bleed air flow passage with the bypass plenum. A portion of the openings are oriented at a discharge angle such that bleed air is discharged from each opening in a direction that does not have a vector component in the direction in which air is flowing in the bypass plenum, and another portion of the openings are oriented to provide stress relief to the deflector.

19 Claims, 8 Drawing Sheets

U.S. PATENT DOCUMENTS

| | | |
|---|---|---|
| 5,729,969 A | 3/1998 | Porte |
| 5,845,482 A | 12/1998 | Carscallen |
| 6,550,254 B2 | 4/2003 | Proctor et al. |
| 6,565,313 B2 * | 5/2003 | Nikkanen et al. ............ 415/144 |
| 6,588,195 B2 * | 7/2003 | Negulescu .................... 60/785 |
| 6,981,842 B2 * | 1/2006 | D'Angelo et al. ........... 415/144 |
| 7,387,489 B2 * | 6/2008 | Appleby et al. ............. 415/144 |
| 2001/0042368 A1 | 11/2001 | Negulescu |
| 2001/0042386 A1 * | 11/2001 | Allam et al. .................. 62/654 |

FOREIGN PATENT DOCUMENTS

| | | |
|---|---|---|
| EP | 1881161 A2 | 1/2008 |
| WO | 03046358 A1 | 6/2003 |

OTHER PUBLICATIONS

EP Search Report, 07115768.9, dated Mar. 13, 2008.

* cited by examiner

BLEED VALVE OUTLET FLOW DEFLECTOR

TECHNICAL FIELD

The present invention relates to bleed valves and, more particularly, to a structurally enhanced bleed valve flow deflector/noise attenuator that improves the mixing of relatively high temperature bleed air with lower temperature engine bypass air.

BACKGROUND OF THE INVENTION

A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. Specifically, high-energy compressed air impinges on turbine vanes and turbine blades, causing the turbine to rotate. The air exiting the turbine section is exhausted from the engine via the exhaust section, and the energy remaining in this exhaust air aids the thrust generated by the air flowing through the bypass plenum.

Many gas turbine engines, such as the above-described turbofan gas turbine engine, include one or more bleed valve assemblies. The bleed valve assemblies are used to selectively bleed some of the compressed air from the compressor section, and most notably the high pressure compressor, before it passes through the remaining sections of the engine. As is generally known, selectively bleeding air from a compressor, via the bleed valve assemblies, is conducted to preclude the compressor from exceeding its surge limits. For turbofan gas turbine engines, such as the one described above, the bleed air may be discharged into the bypass plenum.

Typically, a bleed valve assembly includes a bleed valve and a bleed air duct. When the bleed valve is open, the bleed valve duct directs bleed air flow into the bypass plenum. In most instances, the outlet ports of these discharge ducts may include a flow diffuser and/or noise attenuator through which the bleed air is discharged. Although present bleed valve assemblies and flow diffuser/noise attenuator designs are generally safe, robust, and reliable, these devices do suffer certain drawbacks. For example, the bypass air in the bypass plenum is typically at a relatively low temperature. As such, components within the plenum, including the plenum itself, may not be designed to withstand relatively high temperature air. However, the bleed air from the compressor section is typically at a relatively high temperature. Thus, when the bleed air is discharged into the bypass plenum, if it is not sufficiently mixed with the relatively low temperature bypass air, the temperature of various components within the bypass plenum, and/or the plenum itself, can reach undesirably high temperatures. In addition, the configuration of some previously designed deflectors can result in relatively high stresses in various regions thereof.

Hence, there is a need for a bleed valve assembly and flow deflector that improves the mixing of relatively high temperature bleed air with relatively low temperature bypass air, to thereby minimize the increase in temperature of various components within the bypass plenum, and that is structurally enhanced to reduce stresses in the deflector. The present invention addresses one or more of these needs.

SUMMARY OF THE INVENTION

In one embodiment, and by way of example only, a bleed valve assembly for discharging bleed air into a gas turbine engine bypass plenum having bypass air flowing therein in a first flow direction includes a bleed flow duct, a bleed valve, and a flow deflector. The bleed flow duct has a bleed air inlet and a bleed air outlet. The bleed air inlet is adapted to receive bleed air from a turbine engine compressor, and the bleed air outlet is configured to discharge the bleed air into the bypass plenum. The bleed valve is disposed at least partially within the bleed flow duct and is movable between at least a closed position, in which the bleed air does not flow through the bleed flow duct, and an open position, in which the bleed air flows through the bleed flow duct. The flow deflector is disposed adjacent the bleed air outlet, and has a plurality of openings formed therein. Each opening is symmetrically disposed about a central axis, includes an inlet port in fluid communication with the bleed air flow passage, an outlet port in fluid communication with the bypass plenum, and is oriented at a discharge angle. The plurality of openings includes a first set of openings and a second set of openings. The first set of openings at least partially surrounds the second set of openings. The discharge angle of each opening is an angle relative to a first plane that is tangent to the outlet port of the opening and intersects the central axis of the opening. The discharge angle of each of the first set of openings is substantially perpendicular to the first plane, and the discharge angle of each of the second set of openings is such that bleed air is discharged therefrom in a direction that does not have a vector component in the first flow direction.

In a further exemplary embodiment, a flow deflector for use in discharging a first gas into a passage through which a second gas flows in a flow direction, includes a dome section and a plurality of openings. The dome section has a first side and a second side that is configured to be disposed within the passage. The plurality of openings extend between the first and second sides, and each opening includes an inlet port and an outlet port, and is symmetrically disposed about a central axis. Each opening is further disposed at a discharge angle relative to a plane that is tangent to the outlet port of the opening and intersects the central axis of the opening. The plurality of openings includes a first set of openings and a second set of openings. The first set of openings at least partially surrounds the second set of openings, the discharge angle of each of the first set of openings is substantially perpendicular to the plane, and the discharge angle of each of the second set of openings is an acute angle.

In still another exemplary embodiment, a method of making a bleed valve flow deflector includes forming a substantially concave dome section in at least a portion of a plate that has a first major surface and a second major surface. A first set of openings is formed through an outer peripheral region of the substantially concave dome section, and a second set of openings is formed through a central region of the substantially flat plate. The second set of openings is disposed radially inwardly of, and is spaced apart from, the first set of openings. Each opening of the first set of openings is symmetrically disposed about a line that is normal to the first and second major surfaces, and each opening of the second set of openings is symmetrically disposed about a central axis that is disposed at an acute angle relative to a line that is normal to the first and second major surfaces.

Other independent features and advantages of the bleed valve outlet flow deflector will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
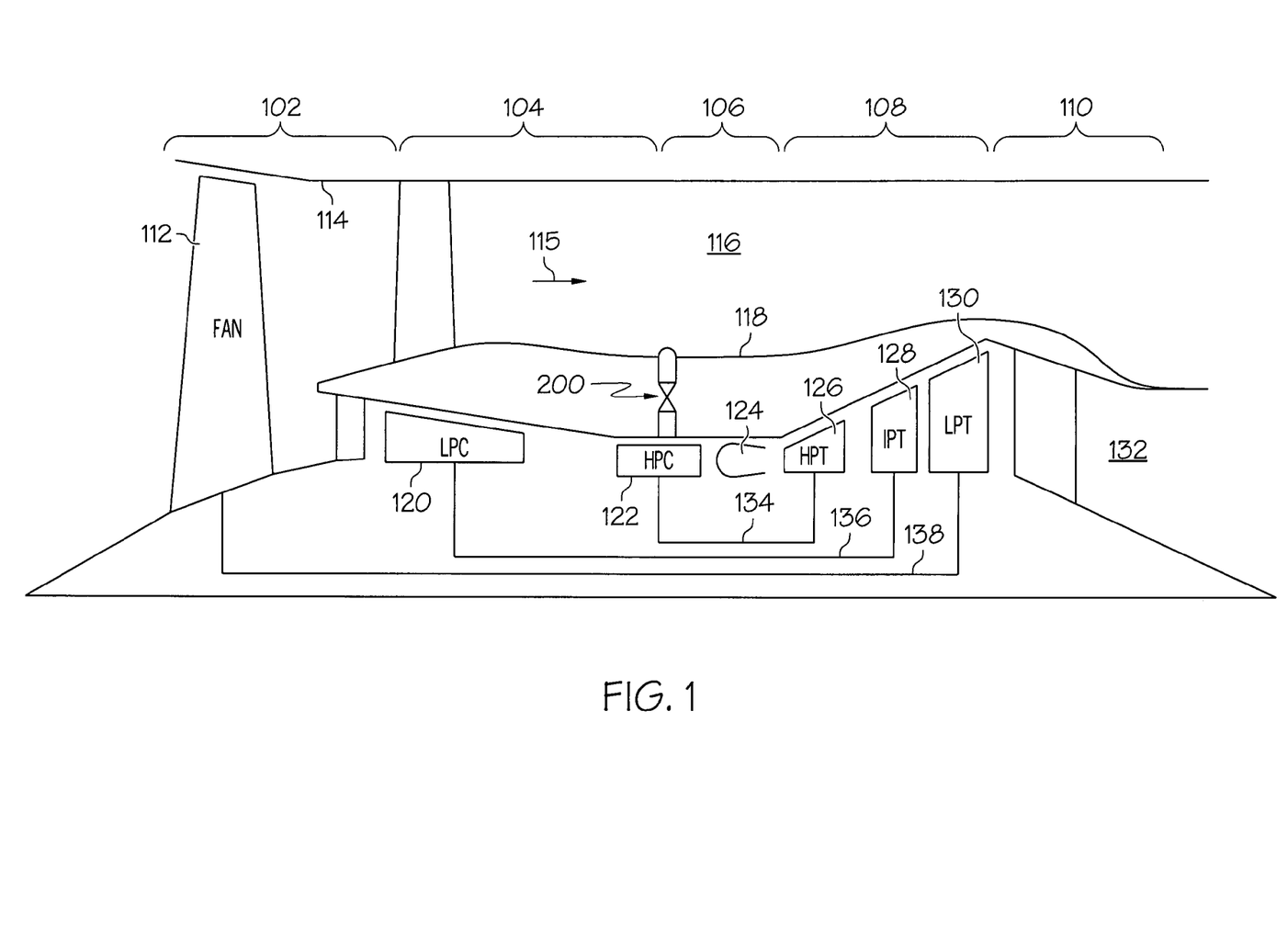
FIG. 1 is a simplified cross section view of a multi-spool turbofan gas turbine jet engine.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 flows, in a flow direction, referred to herein as a bypass air flow direction 115, through a bypass plenum 116 disposed between the fan case 114 and an engine cowl 118, and provides a forward thrust. The remaining fraction of air exhausted from the fan 112 is directed into the compressor section 104.

The compressor section 104 includes two compressors, a low pressure compressor 120, and a high pressure compressor 122. The low pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the low pressure compressor 120 via an intermediate pressure spool 136, and the low pressure turbine 130 drives the fan 112 via a low pressure spool 138.

Figure 2:
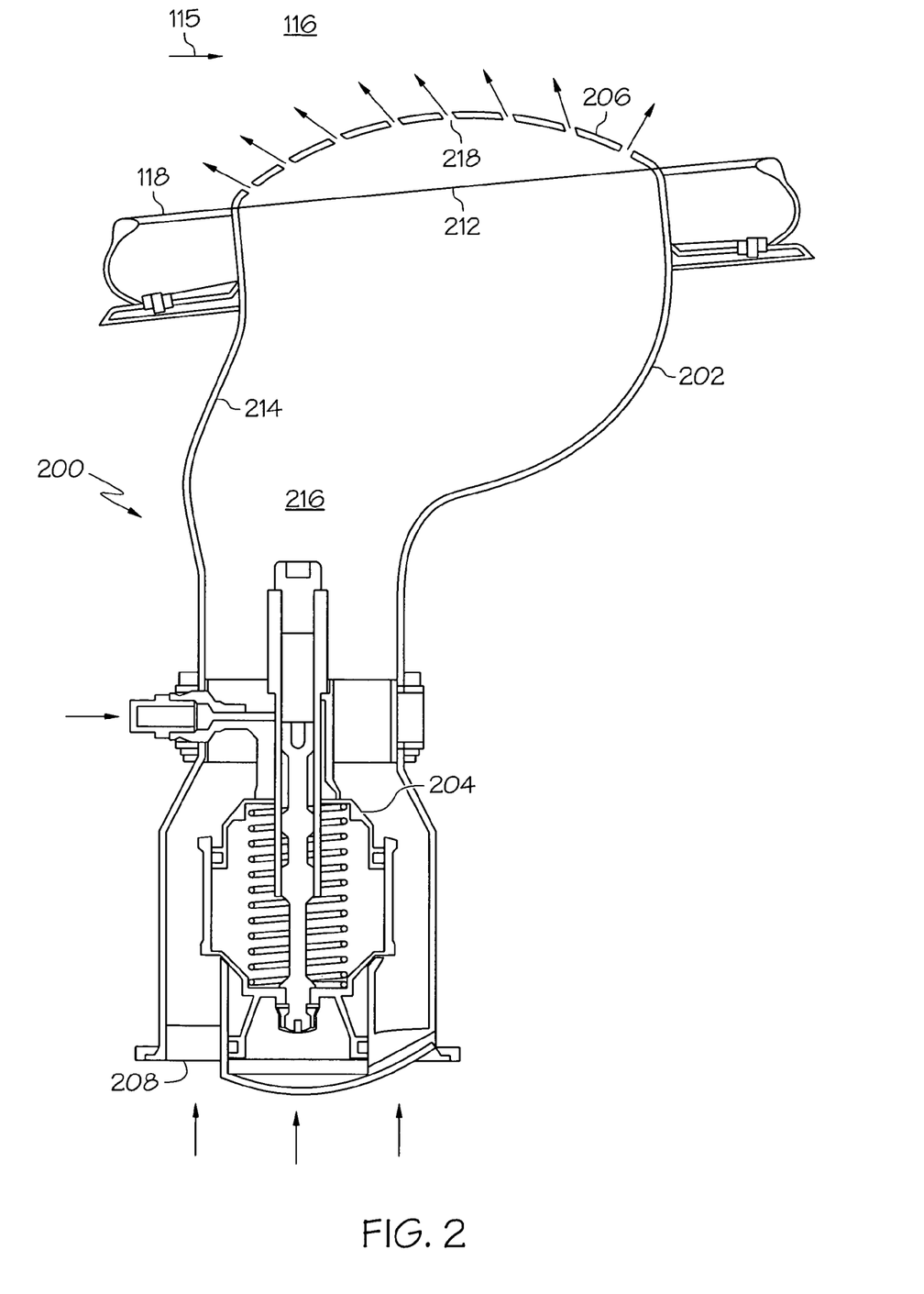
FIG. 2 is a cross section views of an embodiment of a bleed valve assembly that may be used in the engine of FIG. 1, and depicted in the open position.

As is shown schematically in FIG. 1, a portion of the compressed air from the high pressure compressor may be selectively directed into the bypass plenum 116. To do so, one or more bleed valve assemblies 200 are disposed between the high pressure compressor 122 and the bypass plenum 116. A cross section view of an exemplary bleed valve assembly 200 that includes a preferred flow deflector is illustrated in FIG. 2, and with reference thereto will now be described in more detail.

The bleed valve assembly 200 includes a bleed flow duct 202, a bleed valve 204, and a flow deflector 206. The bleed flow duct 202 includes a bleed air inlet 208, a bleed air outlet 212, and an inner surface 214 that defines a bleed air flow passage 216 between the bleed air inlet 208 and bleed air outlet 212. The bleed air inlet 208 is coupled to a bleed air flow passage (not illustrated) that receives relatively hot bleed air from the high pressure compressor 122, and the bleed air outlet 212 is coupled to the engine cowl 118. In the depicted embodiment, the bleed flow duct 202 is contoured such that bleed air is introduced into the flow deflector in a substantially uniform manner.

The bleed valve 204, at least in the depicted embodiment, is mounted within the bleed flow duct 202 and is movable between a closed position and an open position. In the closed position, bleed air at the bleed air inlet 208 does not flow through the bleed air flow passage 216 to the bleed air outlet 212. Conversely, and as FIG. 2 depicts, when the bleed valve 204 is in the open position, bleed air at the bleed air inlet 208 flows into and through the bleed air flow passage 216, through the bleed air outlet 212, and into the bypass plenum 116 via the flow deflector 206. It will be appreciated that the location of the bleed valve 204 depicted in FIG. 2 is merely exemplary, and that the bleed valve may be mounted in any one of numerous locations within, or outside of, the bleed flow duct 202. Moreover, the bleed valve 204 may be implemented as any one of numerous types of valves and not just the particular physical implementation that is depicted in FIG. 2.

The flow deflector 206 is disposed adjacent the bleed air outlet 212, such that bleed air that is discharged from the bleed flow duct 202 flows through the flow deflector 206. Although the specific physical location may vary, in a preferred embodiment the flow deflector 206 is mounted on the bleed air outlet 212 and, when mounted within the gas turbine engine, protrudes into the bypass plenum 116. To facilitate flow through the flow deflector 206, a plurality of openings 218 are formed in, and extend through the flow deflector 206. Moreover, as shown in simplified form in FIG. 2, each opening 218 is oriented at a discharge angle such that, when the bleed valve 204 is in the open position, the bleed air, rather than being discharged unidirectional or omnidirectional, is discharged from a majority of the openings 218 in a direction that opposes the bypass air flow direction 115.

Figure 3:
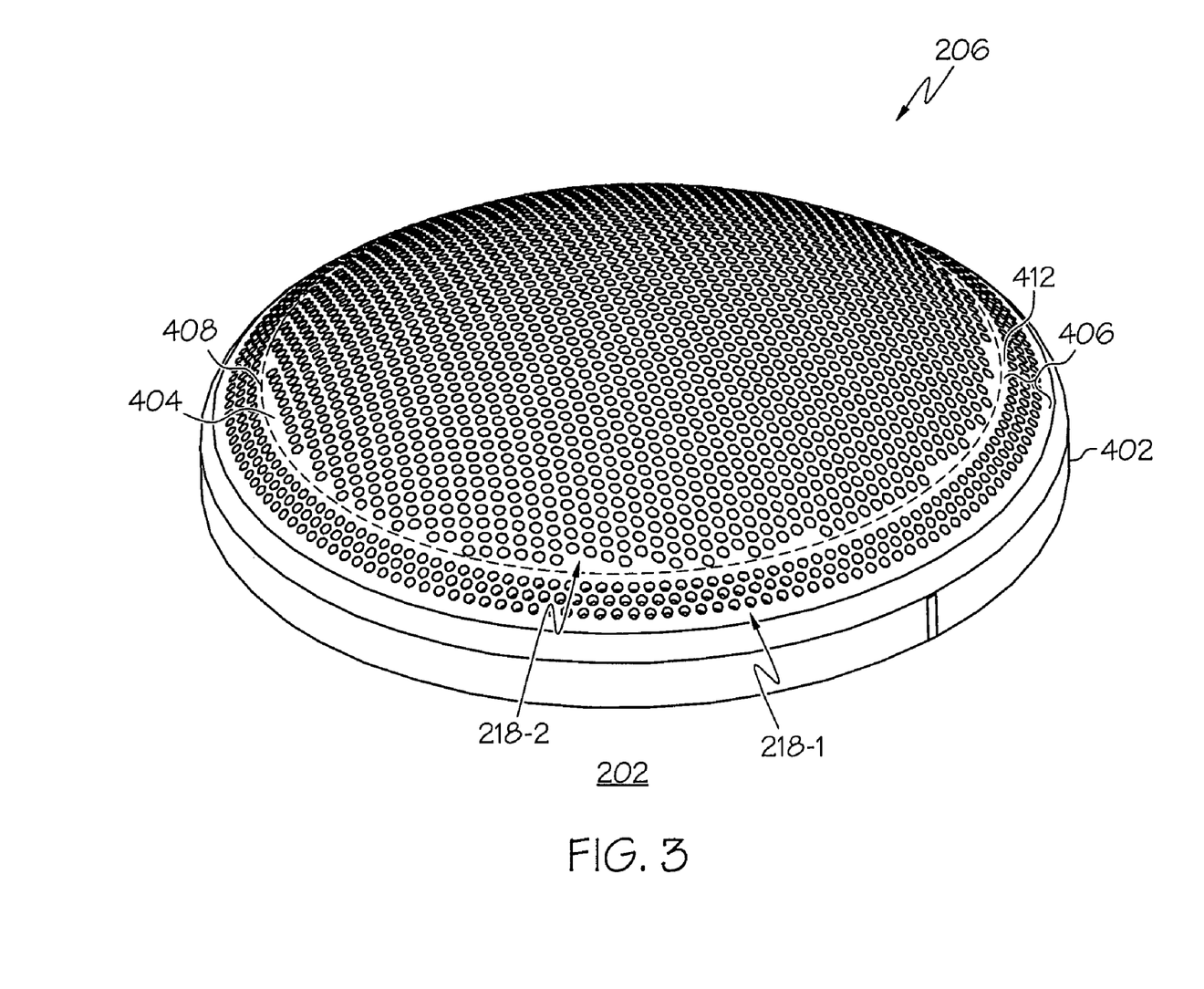
FIGS. 3 and 4 are perspective cross section views of a particular embodiment of a flow deflector that may be used in the bleed valve assembly shown in FIG. 2.
Figure 4:
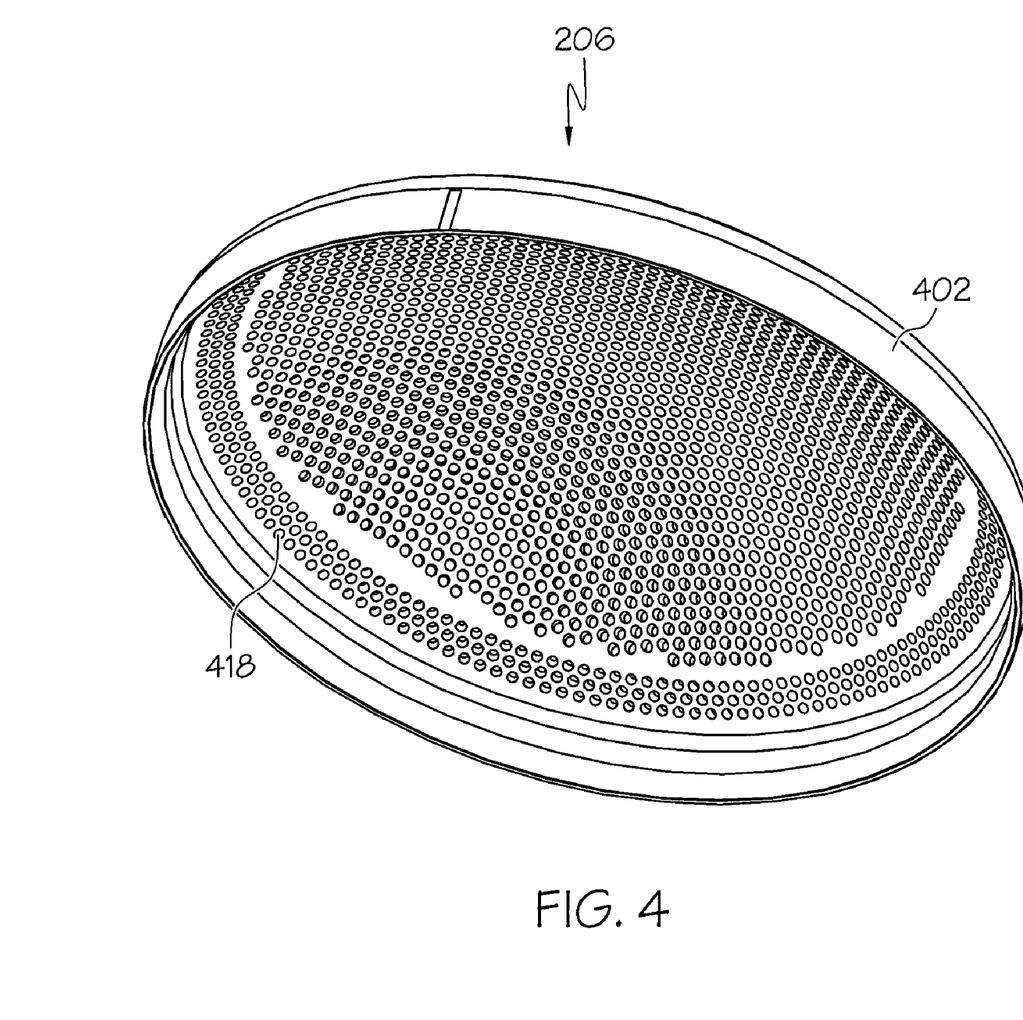

Turning now to FIGS. 3 and 4, perspective views of a particular embodiment of the flow deflector 206 are shown and will be described in more detail. As shown in FIGS. 3 and 4, the flow deflector 206 preferably includes a rim section 402 and a dome section 404. The rim section 402 extends from the dome section 404 and is used to couple the flow deflector 206 to the bleed flow duct 202. Thus, the rim section 402 is preferably shaped substantially similar to that of the bleed flow duct 202, especially near the bleed air outlet 212. For example, in the depicted embodiment, in which the bleed flow duct 202 is substantially circular in cross section near the bleed air outlet 212, the rim section 402 is substantially circular in shape. It will be appreciated that the rim section 402 may be coupled to the bleed flow duct 202 using any one of numerous techniques such as, for example, fasteners, brazing, or welding. In the preferred embodiment, the rim section 402 is coupled using a welding process.

The dome section 404 has the plurality of openings 218 formed therein and, as FIGS. 3 and 4 depict, the openings 218 include two sets of openings, a first set of openings 218-1, and a second set of openings 218-2. The first set of openings 218-1 are formed in an outer peripheral region 406 of the dome section 404, and the second set of openings 218-2 are formed in a central region 408 of the dome section 404. Thus, the first set of openings 218-1 surrounds, or at least partially surrounds, the second set of openings 218-2. As FIGS. 3 and 4 further depict, the first and second sets of openings 218-1, 218-2 are spaced apart from each other, thereby defining a boundary region 412 between the outer peripheral region 406 and the central region 408, in which no openings 218 are formed. It is noted that, solely for clarity, the central region 408 is shown bounded by a dotted line.

Figure 5:
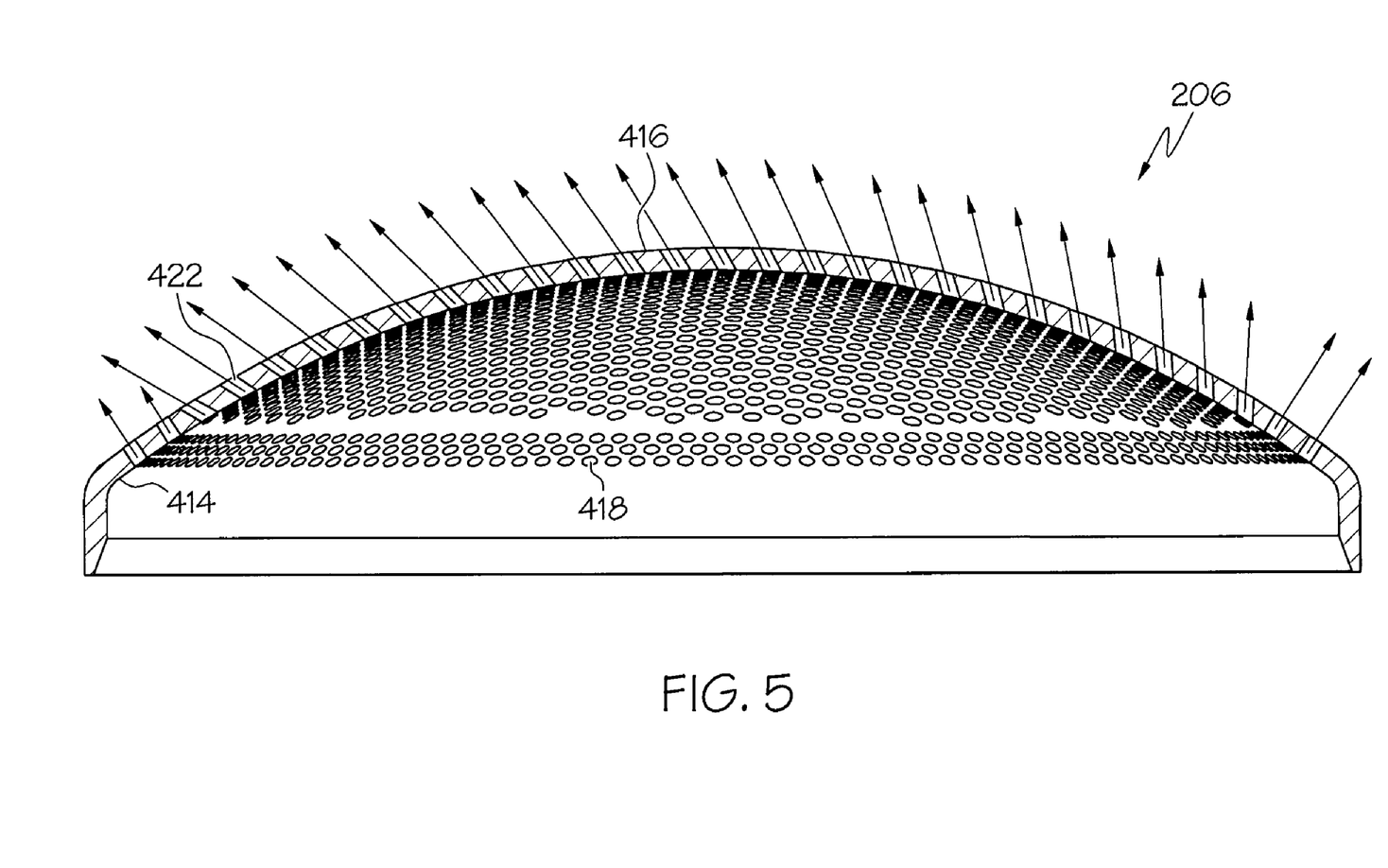
FIGS. 5 and 6 are cross section and partial cross section views, respectively, of the flow deflector depicted in FIGS. 3 and 4.
Figure 6:
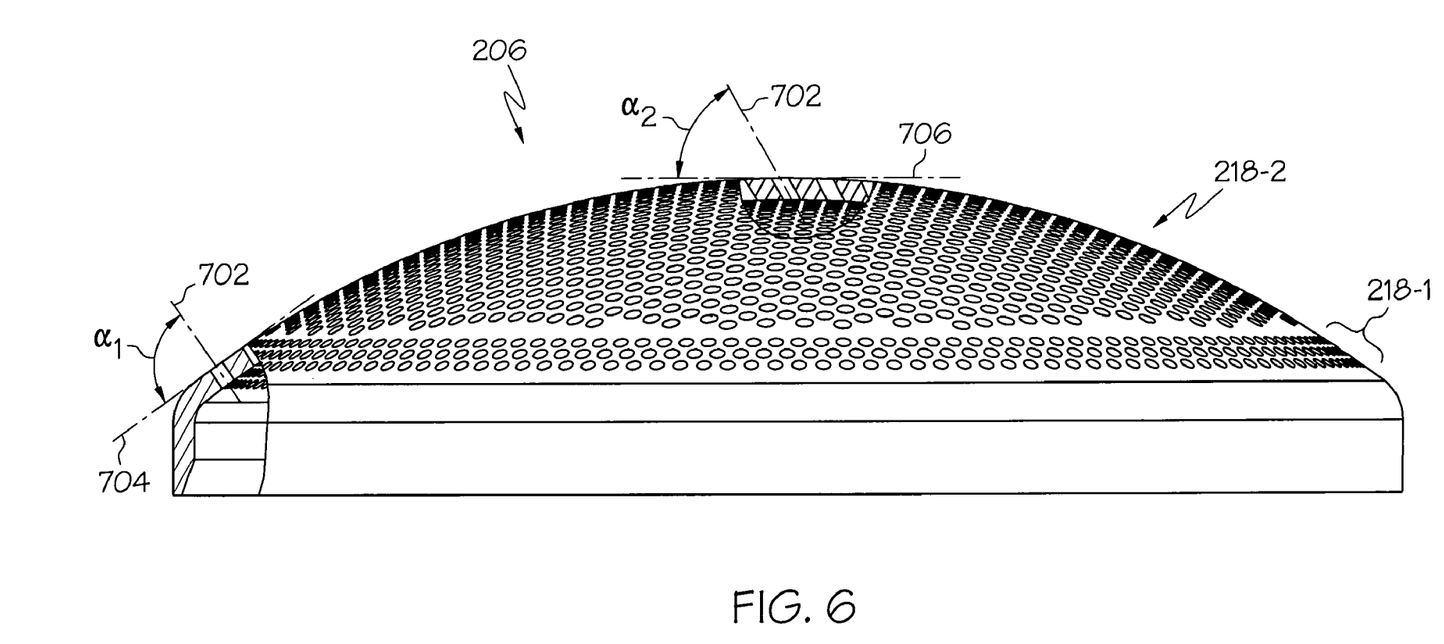

As shown more clearly in FIGS. 5 and 6, each of the openings 218 that comprise the first and second sets of openings 218-1, 218-2 extend between an inner side 414 and an outer side 416 of the dome section 404. Each opening 218 further includes an inlet port 418 that is coextensive with the dome inner side 414, and an outlet port 422 that is coextensive with the dome outer side 416, to thereby provide fluid communication between the dome inner and outer sides 414, 416. Thus, as described above, when the flow deflector 206 is coupled to the bleed flow duct 202, the openings 218 facilitate bleed air flow through the flow deflector 206.

It will be appreciated that the shape, configuration, number, and size of the openings 218 may vary. In a preferred embodiment, however, each opening 218 is substantially cylindrical in shape and, as shown most clearly in FIG. 6, are thus each symmetrically disposed about a central axis 702. In addition to variations in shape, configuration, number, and size, the discharge angle and orientation of each opening 218 may also vary to provide a desired relative discharge direction. For example, each opening 218 may be formed at the same or different discharge angles, the openings 218 located along different planes may be formed at different discharge angles, or openings located at different radii from the center of the dome section 404 may be formed at different discharge angles. Preferably, however, each opening that comprises the first set of openings 218-1 is formed at a discharge angle ($\alpha_1$) that is perpendicular, or at least substantially perpendicular, to a plane 704 that is tangent to its outlet port 422 and intersects its central axis 702, and each opening that comprises the second set of openings 218-2 is formed at a non-perpendicular discharge angle ($\alpha_2$) relative to a plane 706 that is tangent to its outlet port 422 and intersects its central axis 702. It will be appreciated that the non-perpendicular discharge angle ($\alpha_2$) may vary depending, for example, on the radius of curvature of the dome section 404. However, the non-perpendicular discharge angle ($\alpha_2$) is selected to ensure that each of the second set of openings 218-2, whether located at a relatively upstream or downstream position, discharges bleed air in a direction that does not have a vector component in the bypass air flow direction 115. In a particular preferred embodiment, in which the dome section 404 is formed with a radius of curvature of about 5.8 inches, a non-perpendicular discharge angle ($\alpha_2$) of about 60° provides this preferred configuration.

By forming each of the first set of openings 218-1 at a perpendicular, or at least substantially perpendicular, discharge angle ($\alpha_1$), stress in the dome outer peripheral region 406 is reduced relative to a dome section 404 having no openings or openings oriented similar to those of the second set of openings 218-2. Moreover, due to the curvature of the dome section 404, each of the second set of openings 218-2 at different positions on the dome section 404 relative to the bypass air flow direction 115, are oriented differently. As a result, the direction in which bleed air is discharged from the second set of openings 218-2 into the bypass plenum 116 also varies. More specifically, and as shown most clearly in FIG. 5, for bleed air discharged from the second set of openings 218-2, bleed air discharged from openings 218 located at relatively upstream positions is discharged in a direction that opposes bypass air flow more so than bleed air that is discharged from openings 218 that are located at relatively downstream positions.

Each opening 218 that comprises the first and second sets of openings 218-1, 218-2 are preferably equally spaced from each other. The number and size of the openings that comprise each set of openings 218-1, 218-2 are selected to provide a sufficient amount of flow area through the dome section 404 so as to not adversely restrict bleed air flow through the flow deflector 206. Although the percent flow area through the dome section 404 may vary between, for example, approximately 20% and approximately 45%, in a particular preferred embodiment the percent flow area is approximately 32%. Additionally, the openings that comprise the first set of openings 218-1 are selected to provide sufficient stress relief in the dome peripheral section 406.

Figure 7:
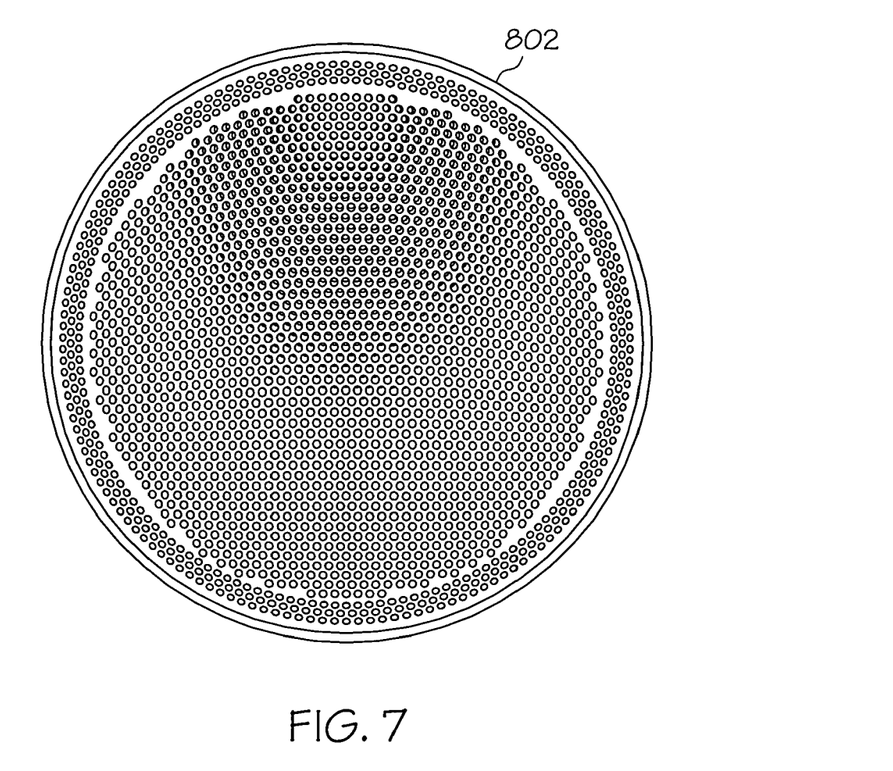
FIG. 7 is a top view of a substantially flat plate that may be used to manufacture the flow deflector shown in FIGS. 3-6.
Figure 8:
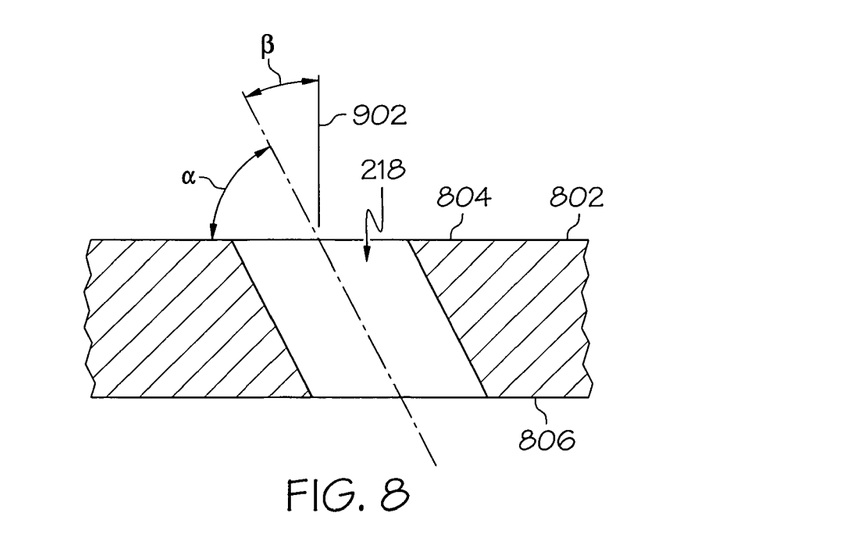
FIG. 8 is a close-up cross section view of a portion of plate shown in FIG. 7, depicting the configuration of the openings that are formed in the plate.

It will be appreciated that the flow deflector 206 may be formed using any one of numerous techniques and any one of numerous processes. With reference now to FIGS. 7 and 8 a particular preferred process for forming the flow deflector 206 will be described. Referring first to FIG. 7, the flow deflector 206 is preferably formed from a substantially flat, circular plate constructed of a suitable material, and having a suitable diameter and suitable thickness. In a particular preferred embodiment, the plate 802 is constructed of a metal such as, for example, nickel alloy, and has a diameter of about 8 inches, and a thickness of about 0.125 inches. No matter the specific material and dimensions, the plate 802 is formed into a three dimensional contour that includes the rim section 402 and the dome section 404. It will be appreciated that the dome section 404 may be spherical, a rotation of an ellipse, or any one of numerous other curved shapes. Preferably, the dome section 404 is substantially spherical and is formed by pressing the flat plate 802 over a form having the desired curvature.

After the plate 802 has been formed into the three dimensional contour, the first and second sets of openings 218-1, 218-2 are then formed through the plate 802 via a suitable process such as, for example, a drilling process. As noted above, the number and size of each opening 218 that comprises the first and second sets of openings 218-1, 218-2 may vary to provide a suitable amount of flow area and stress relief. In the embodiment depicted in FIG. 7 and described herein, about 450 evenly spaced openings 218, configured in three concentric rows, comprise the first set of openings 218-1, and about 1700 evenly spaced openings 218 comprise the second set of openings 218-2. Moreover, each opening 218 preferably has a diameter of about 0.085±0.003 inches, to provide the desired amount of flow area and stress relief.

Each opening 218 that comprises the first set of openings 218-1 is formed through the plate 802 at the perpendicular, or at least substantially perpendicular, angle ($\alpha_1$), and each opening 218 that comprises the second set of openings 218-2 is formed through the plate 802 at the same non-perpendicular angle ($\alpha_2$). In particular, and with reference now to FIG. 8, it is seen that each opening 218 that comprises the second set of openings 218-2 is preferably formed at a predetermined angle ($\beta$) relative to a line 902 that is normal to each major surface 904, 906 of the plate 802. This angle may vary, but in the depicted embodiment the predetermined angle ($\beta$) is about 30° relative to the normal line 902. As FIG. 8 additionally depicts, a predetermined angle ($\beta$) of 30° relative to the normal line 902, corresponds to the above-described non-perpendicular discharge angle ($\alpha_2$) of 60° relative to the plane 706.

After the flow deflector 206 is formed, it is coupled to the bleed flow duct 202 and the bleed valve assembly 200 may then be installed in the engine 100. In doing so, the bleed valve assembly 200 is preferably installed in the configuration depicted in FIG. 2 a, so that when bleed air is discharged from the valve assembly 200, it is discharged in a direction that either opposes, or is substantially perpendicular to, the bypass air flow direction 115. In other words, none of the bleed air is discharged from the bleed valve assembly 200 in a direction having a vector component that is in the same direction as the bypass air flow direction 115.

Figure 9:
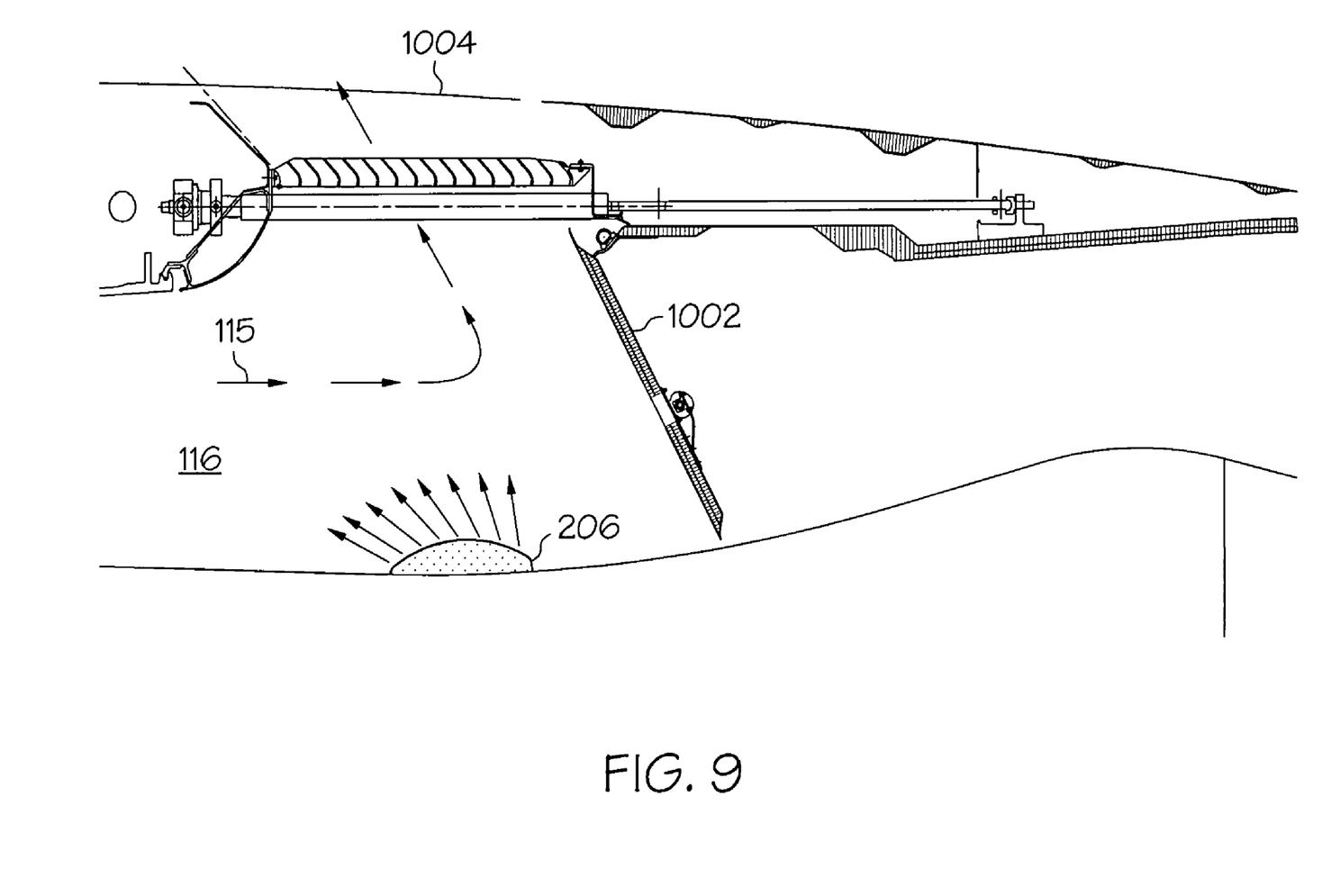
FIG. 9 is a simplified cross section view of a bypass plenum of a gas turbine engine, depicting an embodiment of a bleed air flow deflector installed therein and with the thrust reverser blocker doors in a deployed position.

Because the bleed air is discharged from a vast majority of the openings 218 in a direction that opposes the bypass air flow direction 115, mixing of the relatively hot bleed air with the relatively cool bypass air is enhanced. This enhanced mixing ensures that the bypass plenum 116 and various components disposed within the bypass plenum 116 are exposed to relatively cooler air. For example, and with reference now to FIG. 9, in some aircraft engines, when the aircraft thrust reversers are deployed, a plurality of blocker doors 1002 (only one shown) are rotated into the bypass plenum 116. In this position, the blocker doors 1002 redirect the bypass air flow in a forward direction through, for example, a plurality of cascade vanes 1004, creating a reverse thrust. In such engines, the enhanced mixing of the relatively hot bleed air with the relatively cool bypass air reduces the temperatures to which the blocker doors 1002 and cascade vanes 1004 are exposed when the aircraft thrust reversers are deployed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A bleed valve assembly for discharging bleed air into a gas turbine engine bypass plenum having bypass air flowing there-through in a first flow direction, the valve assembly comprising:
    a bleed flow duct having bleed air inlet and a bleed air outlet, the bleed air inlet adapted to receive bleed air from a turbine engine compressor, the bleed air outlet configured to discharge the bleed air into the bypass plenum;
    a bleed valve disposed at least partially within the bleed flow duct and movable between at least a closed position, in which the bleed air does not flow through the bleed flow duct, and an open position, in which the bleed air flows through the bleed flow duct; and
    a flow deflector disposed adjacent the bleed air outlet, the flow deflector having a plurality of openings formed therein, each opening symmetrically disposed about a central axis and including an inlet port in fluid communication with the bleed air flow passage and an outlet port in fluid communication with the bypass plenum, each opening further oriented at a discharge angle,
    wherein:
        the plurality of openings includes a first set of openings and a second set of openings, the first set of openings at least partially surrounding the second set of openings,
        the discharge angle of each opening is an angle relative to a first plane that is tangent to the outlet port of the opening and intersects the central axis of the opening,
        the discharge angle of each of the first set of openings is substantially perpendicular to the first plane, and
        the discharge angle of each of the second set of openings is such that bleed air is discharged therefrom in a direction that does not have a vector component in the first flow direction.

2. The assembly of claim 1, wherein the discharge angle of each of the second set of openings is an acute angle.

3. The assembly of claim 1, wherein the discharge angle of each of the second set of openings is between about 55-degrees and about 65-degrees.

4. The assembly of claim 1, wherein the discharge angle of each of the second set of openings is about 60-degrees.

5. The assembly of claim 1, wherein the flow deflector includes:
    a dome section having a substantially curved contour; and
    a rim section surrounding, and extending axially from, the dome section, the rim section coupled to the bleed flow duct.

6. The assembly of claim 5, wherein the dome section is substantially concave in orientation.

7. The assembly of claim 1, wherein:
    the dome section includes a central region and an outer peripheral region that surrounds the central region;
    the first set of openings are evenly spaced around the outer peripheral region; and
    the second set of openings are evenly spaced around the central region.

8. The assembly of claim 7, wherein:
    the first and second sets of openings define a boundary region in the dome section between the central region and the outer peripheral region; and the boundary region has no openings formed therein.

9. The assembly of claim 1, wherein the dome section has a substantially spherical contour.

10. A flow deflector for use in discharging a first gas into a passage through which a second gas flows in a flow direction, the flow deflector comprising:
   a dome section having a first side and a second side, the second side configured to be disposed within the passage; and
   a plurality of openings extending between the first and second sides, each opening including an inlet port and an outlet port, and symmetrically disposed about a central axis, each opening further disposed at a discharge angle relative to a plane that is tangent to the outlet port of the opening and intersects the central axis of the opening, wherein:
      the plurality of openings includes a first set of openings and a second set of openings, the first set of openings at least partially surrounding the second set of openings,
      the discharge angle of each of the first set of openings is substantially perpendicular to the plane, and
      the discharge angle of each of the second set of openings is an acute angle.

11. The flow deflector of claim 10, wherein the discharge angle of each of the second set of openings is between about 55-degrees and about 65-degrees.

12. The flow deflector of claim 11, wherein the discharge angle of each of the second set of openings is about 60-degrees.

13. The flow deflector of claim 10, further comprising:
   a rim section surrounding, and extending axially from, the dome section, the rim section adapted to couple to the flow deflector to a bleed flow duct.

14. The flow deflector of claim 10, wherein the dome section is substantially concave in orientation.

15. The flow deflector of claim 10, wherein:
   the dome section includes a central region and an outer peripheral region that surrounds the central region;
   the first set of openings are evenly spaced around the outer peripheral region; and
   the second set of openings are evenly spaced around the central region.

16. The flow deflector of claim 15, wherein:
   the first and second sets of openings define a boundary region in the dome section between the central region and the outer peripheral region; and
   the boundary region has no openings formed therein.

17. The flow deflector of claim 10, wherein the dome section has a substantially spherical contour.

18. A method of making a bleed valve flow deflector, comprising the steps of:
   forming a substantially concave dome section in at least a portion of a plate, the flat plate having a first major surface and a second major surface;
   forming a first set of openings through an outer peripheral region of the substantially concave dome section;
   forming a second set of openings, through a central region of the substantially concave dome section, the second set of openings disposed radially inwardly of, and spaced apart from, the first set of openings,
   wherein:
      each opening of the first set of openings is symmetrically disposed about a line that is normal to the first and second major surfaces, and
      each opening of the second set of openings is symmetrically disposed about a central axis that is disposed at an acute angle relative to a line that is normal to the first and second major surfaces.

19. The method of claim 18, wherein the acute angle is between about 25° to about 35°.

* * * * *